United States Patent
Hussein et al.

(10) Patent No.: US 11,443,514 B2
(45) Date of Patent: Sep. 13, 2022

(54) RECOGNIZING MINUTES-LONG ACTIVITIES IN VIDEOS

(71) Applicant: QUALCOMM Technologies, Inc., San Diego, CA (US)

(72) Inventors: Noureldien Mahmoud Elsayed Hussein, The Hague (NL); Efstratios Gavves, Amsterdam (NL); Arnold Wilhelmus Maria Smeulders, Amsterdam (NL)

(73) Assignee: Qualcomm Technologies, Inc., San Diego, CA (US)

( * ) Notice: Subject to any disclaimer, the term of this patent is extended or adjusted under 35 U.S.C. 154(b) by 344 days.

(21) Appl. No.: 16/827,342

(22) Filed: Mar. 23, 2020

(65) Prior Publication Data

US 2020/0302185 A1    Sep. 24, 2020

(51) Int. Cl.
*G06K 9/62* (2022.01)
*G06V 20/40* (2022.01)
*G06N 3/04* (2006.01)

(52) U.S. Cl.
CPC ............ *G06V 20/47* (2022.01); *G06N 3/04* (2013.01); *G06V 20/41* (2022.01)

(58) Field of Classification Search
CPC ...... G06V 20/47; G06V 20/41; G06V 10/426; G06V 10/454; G06V 10/82; G06N 3/04; G06N 3/084; G06N 3/0454
See application file for complete search history.

(56) References Cited

U.S. PATENT DOCUMENTS

| | | | |
|---|---|---|---|
| 2009/0082699 A1* | 3/2009 | Bang | G16H 50/20 600/595 |
| 2014/0143183 A1* | 5/2014 | Sigal | G06N 20/00 706/12 |
| 2015/0363644 A1* | 12/2015 | Wnuk | G06F 16/24578 382/103 |
| 2018/0004751 A1* | 1/2018 | Vikhe | G06F 16/24578 |
| 2019/0378007 A1* | 12/2019 | Markram | G06N 3/04 |
| 2020/0065483 A1* | 2/2020 | Mu | G06F 21/554 |
| 2020/0302177 A1* | 9/2020 | Nguyen | G06F 16/9024 |
| 2021/0392055 A1* | 12/2021 | Mohan | H04L 43/16 |

* cited by examiner

*Primary Examiner* — Solomon G Bezuayehu
(74) *Attorney, Agent, or Firm* — Seyfarth Shaw LLP

(57) ABSTRACT

A method for classifying subject activities in videos includes learning latent (previously generated) concepts that are analogous to nodes of a graph to be generated for an activity in a video. The method also includes receiving video segments of the video. A similarity between the video segments and the previously generated concepts is measured to obtain segment representations as a weighted set of latent concepts. The method further includes determining a relationship between the segment representations and their transitioning pattern over time to determine a reduced set of nodes and/or edges for the graph. The graph of the activity in the video represented by the video segments is generated based on the reduced set of nodes and/or edges. The nodes of the graph are represented by the latent concepts. Subject activities in the video are classified based on the graph.

20 Claims, 9 Drawing Sheets

RECOGNIZING MINUTES-LONG ACTIVITIES IN VIDEOS

CROSS-REFERENCE TO RELATED APPLICATION

The present application claims priority to Greece Patent Application No. 20190100142, filed on Mar. 22, 2019, and titled "VIDEOGRAPH: RECOGNIZING MINUTES-LONG HUMAN ACTIVITIES IN VIDEOS," the disclosure of which is expressly incorporated by reference herein in its entirety.

BACKGROUND

Field

Aspects of the present disclosure generally relate to temporal modeling of video signals, and more particularly to learning temporal representations of minutes-long activities in a video.

Background

Many activities (e.g., human activities) in a video can take minutes or sometimes hours to unfold. To represent these human activities, conventional implementations are directed to statistical pooling, which neglects temporal structures. Others are directed to convolutional methods, such as convolutional neural networks (CNNs). While these conventional implementations may learn temporal concepts, they fall short when modeling minutes-long temporal dependencies.

SUMMARY

In an aspect of the present disclosure, a method for classifying subject activities in videos is presented. The method includes receiving video segments of a video. In addition, the method includes measuring a similarity between the video segments and the previously generated concepts to obtain segment representations as a weighted set of previously generated concepts. The method further includes determining a relationship between the segment representations and their transitioning pattern over time to determine a reduced set of nodes and/or edges for a graph. The method also includes generating the graph of the activity in the video represented by the video segments based on the reduced set of nodes and/or edges. The nodes of the graph are represented by the previously generated concepts. Furthermore, the method includes classifying subject activities in the video based on the graph.

In another aspect of the present disclosure, an apparatus for classifying subject activities and videos is presented. The apparatus includes a memory and one or more processors. The one or more processors are coupled to the memory and configured to receive video segments of a video. The processor(s) are additionally configured to measure a similarity between the video segments and the previously generated concepts to obtain segment representations as a weighted set of previously generated concepts. The processor(s) are further configured to determine a relationship between the segment representations and their transitioning pattern over time to determine a reduced set of nodes and/or edges for a graph. The processor(s) are also configured to generate the graph of the activity in the video represented by the video segments based on the reduced set of nodes and/or edges. The nodes of the graph are represented by the previously generated concepts. Furthermore, the processor(s) are configured to classify subject activities in the video based on the graph.

In an aspect of the present disclosure, an apparatus for classifying subject activities in videos is presented. The apparatus includes means for receiving video segments of a video. In addition, the apparatus includes means for measuring a similarity between the video segments and the previously generated concepts to obtain segment representations as a weighted set of previously generated concepts. The apparatus further includes means for determining a relationship between the segment representations and their transitioning pattern over time to determine a reduced set of nodes and/or edges for a graph. The apparatus also includes means for generating the graph of the activity in the video represented by the video segments based on the reduced set of nodes and/or edges. The nodes of the graph are represented by the previously generated concepts. Furthermore, the apparatus includes means for classifying subject activities in the video based on the graph.

In another aspect of the present disclosure, a non-transitory computer readable medium is presented. The computer readable medium has encoded thereon program code for classifying subject activities and videos. The program is executed by a processor and includes program code to receive video segments of a video. The program code additionally includes program code to measure a similarity between the video segments and the previously generated concepts to obtain segment representations as a weighted set of previously generated concepts. The program code further includes program code to determine a relationship between the segment representations and their transitioning pattern over time to determine a reduced set of nodes and/or edges for a graph. The program code also includes program code to generate the graph of the activity in the video represented by the video segments based on the reduced set of nodes and/or edges. The nodes of the graph are represented by the previously generated concepts. Furthermore, the program code includes program code to classify subject activities in the video based on the graph.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
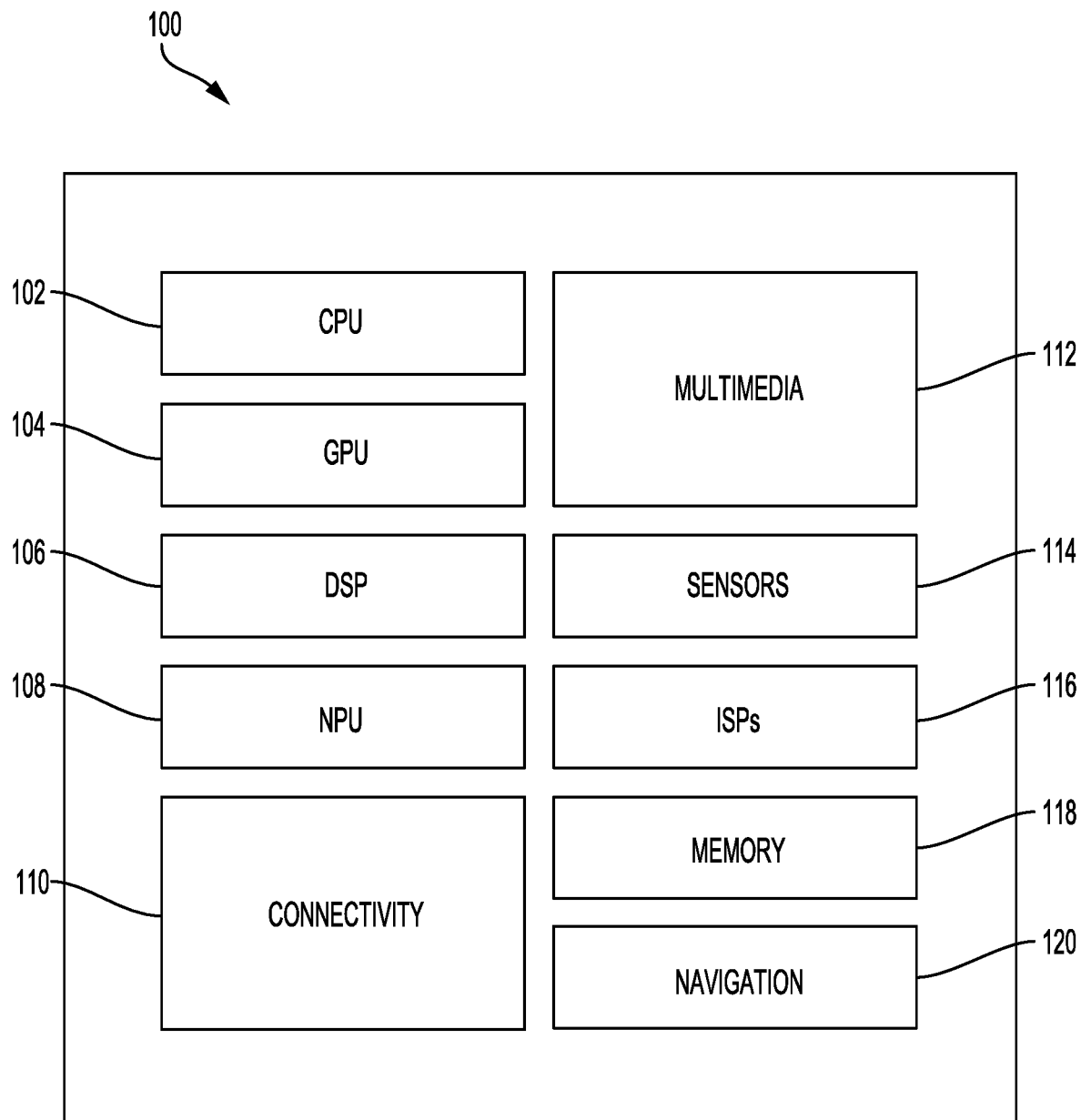
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Many activities (e.g., human activities) in videos can take minutes or even hours to unfold. Each activity can include many fine-grained visual details. Exemplary activities may include making a pancake and preparing scrambled eggs.

Aspects of the present disclosure are directed to a video-graph that represents human activities and learns their underlying temporal structure. The human activities may be minutes-long (e.g., five minutes or thirty minutes). The video-graph (may also be referred to as "graph") may learn a graph-based representation for human activities. In some aspects, the graph, including one or more nodes and edges thereof, may be learned from video datasets. As such, the graph may be applicable to videos without node-level annotations. For example, the graph may learn the temporal structure of human activities in minutes-long videos.

In accordance with aspects of the present disclosure, a method for classifying subject activities in videos includes learning latent (previously generated) concepts that are analogous to nodes of a graph generated for an activity in a video. The latent concepts may be learned using fully connected layers of a neural network. A similarity between the latent concepts and video segments received by a video-graph framework may be measured to obtain segment representations as a weighted set of latent concepts. This measurement may be performed to mitigate the absence of link information by using the segment representations to obtain edges for a potential graph or graph to be generated. A relationship may be learned between the segment representations and a transitioning pattern between such segment representations over time to determine a reduced set of edges for the potential graph.

A graph of the activity in the video represented by the video segments may be generated based on the reduced set of edges, where the nodes of the graph are represented by the latent concepts. The graph may be modeled using graph embedding layers to obtain a final video representation before a classifier. The classifier may classify the activity in the video based on the generated graph. The activities in the video may, for example include human activities, where the latent concepts represent key actions of human activities in a video dataset or any other activities including animal activities.

FIG. 1 illustrates an example implementation of a system-on-a-chip (SOC) 100, which may include a central processing unit (CPU) 102 or a multi-core CPU configured for classifying subject activities in videos in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may comprise code to learn latent concepts that are analogous to nodes of a graph to be generated of an activity in a video. The general-purpose processor 102 may also comprise code to receive video segments. The general-purpose processor 102 may further comprise code to measure a similarity between the video segments and the latent concepts to obtain segment representations as a weighted set of latent concepts. The general-purpose processor 102 may still further comprise code to learn a relationship between the segment representations and their transitioning pattern over time to determine a reduced set of nodes and/or edges for the graph. The general-purpose processor 102 may also comprise code to generate the graph of the activity in the video represented by the video segments based on the reduced set of nodes and/or edges, where the nodes of the graph are represented by the latent concepts. The general-purpose processor 102 may also comprise code to classify subject activities in the video based on the graph.

Deep learning architectures may perform an object recognition task by learning to represent inputs at successively higher levels of abstraction in each layer, thereby building up a useful feature representation of the input data. In this way, deep learning may address a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
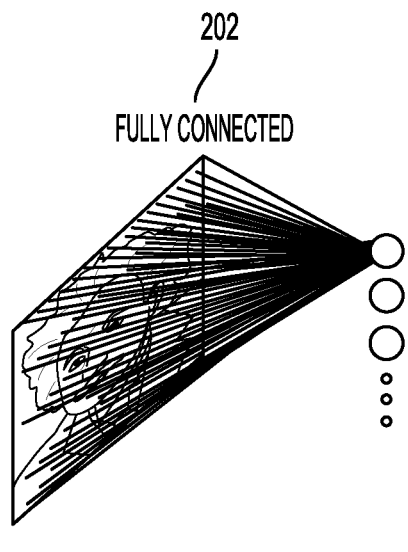
FIGS. 2A, 2B, and 2C are diagrams illustrating a neural network in accordance with aspects of the present disclosure.
Figure 2B:
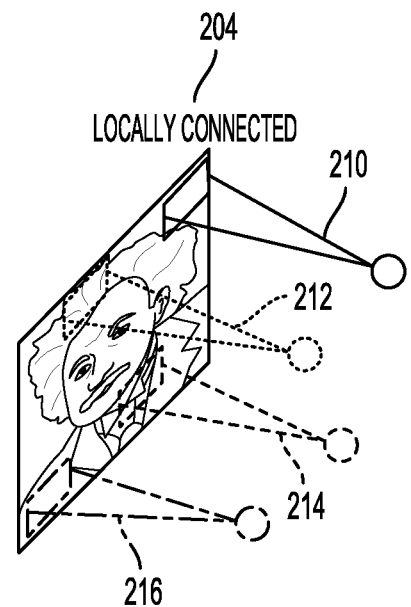

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
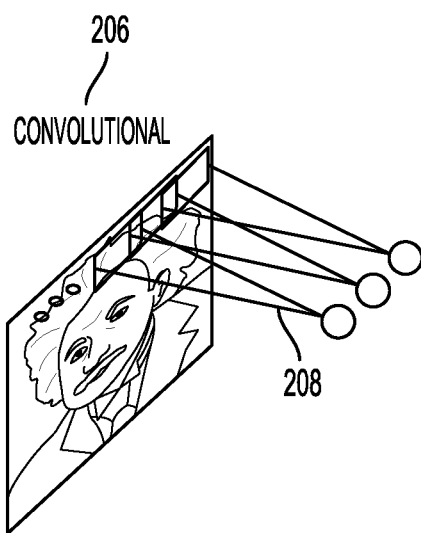

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
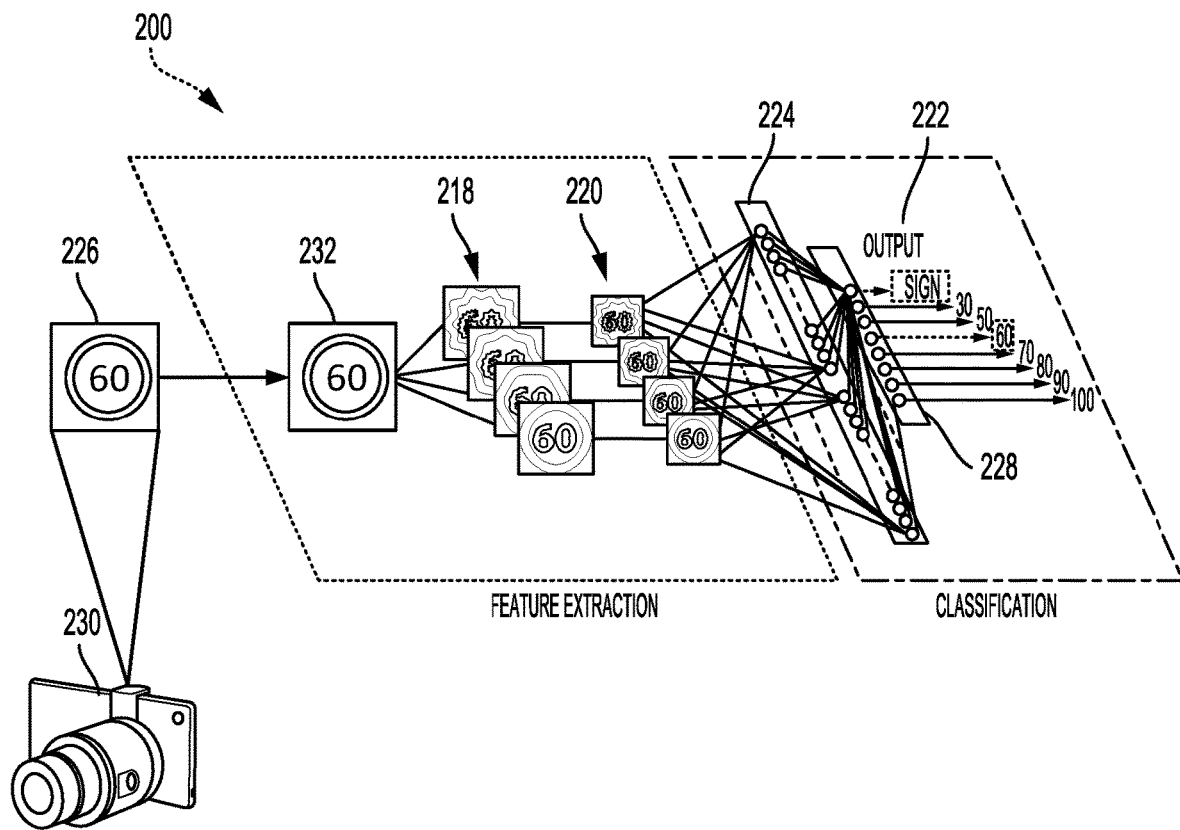
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
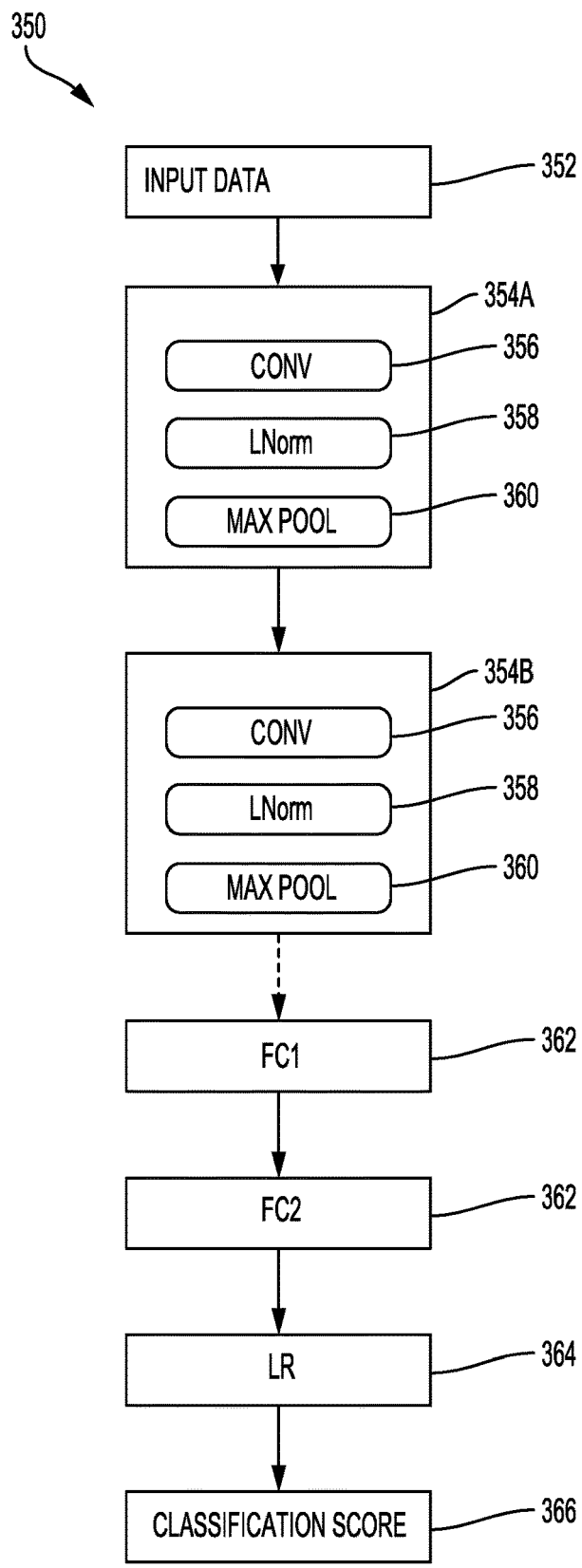
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
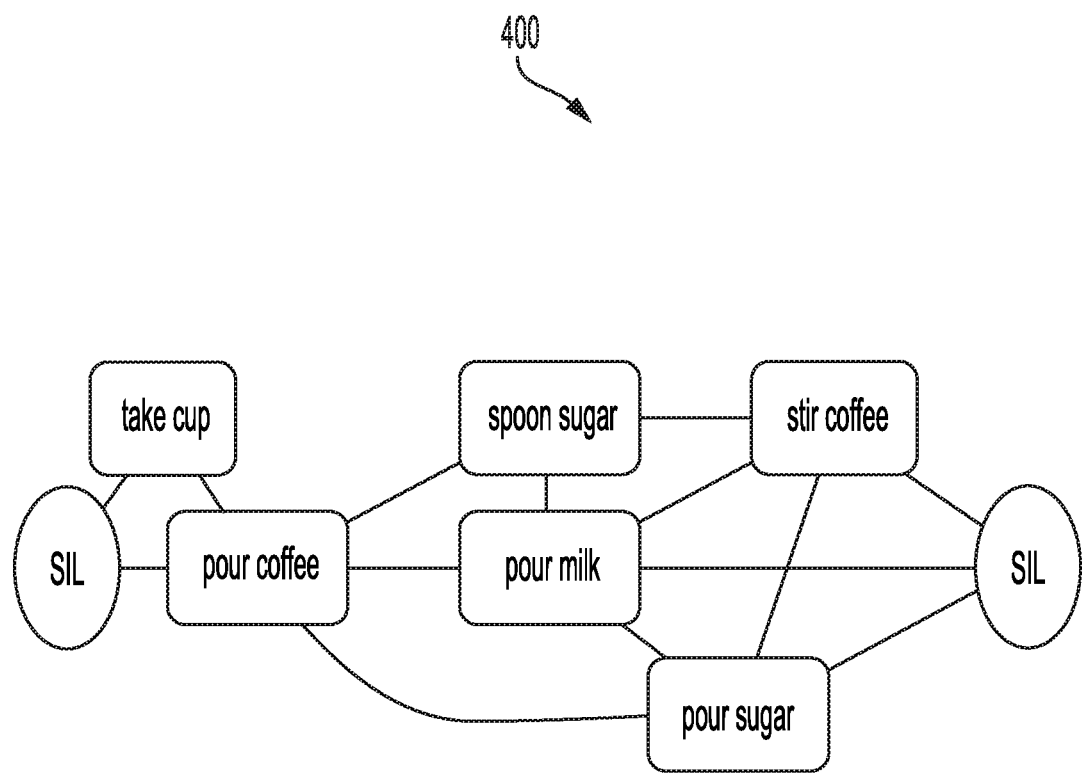
FIG. 4 illustrates an activity represented in an undirected graph of unit actions.

FIG. 4 illustrates an activity represented in an undirected graph 400 of unit actions in accordance with an aspect of the present disclosure. An undirected graph is a set of objects or nodes that are connected together, or all of the connections (may also be referred to as edges) are bidirectional. Referring to FIG. 4, the undirected graph 400 illustrates various ways of carrying out the activity of making coffee. The undirected graph 400 preserves a temporal structure of corresponding unit actions. The activity of making coffee includes a set of unit actions. For example, the activity of making coffee may include the following unit actions: take cup; pour coffee; spoon sugar; pour milk; pour sugar; and stir coffee. SIL elements delimiters indicating the extent of an activity.

A viewer may find it difficult to discriminate a video of human or animal activity unless multiple portions of the video are reasoned. For example, a viewer may find it difficult to discriminate an event of "making coffee" by seeing only an action of taking a cup in a "take cup" video segment. Attention may also be paid to recognizing the fine-details of the activity in the video because some of the details may be useful for discrimination. For example, an action of pouring coffee in a "pour coffee" video segment may be a unique yet discriminant detail for the activity of "making coffee." As such, it is desirable to model temporal dependencies of these details to recognize minutes-long human activities in videos. This follows because the processing capacity of a computer vision model is bounded. Therefore, it may be beneficial to divide computer resources between paying attention to details and grasping the big picture of human activity in the video.

Temporal modeling of video signals can be classified into order-less and order-centric temporal modeling. In order-less approaches, one focus is statistical pooling of temporal signals in videos, without considering their temporal order. To represent a human or animal activity, a minutes-long video may be divided into video segments or video frames. Each of the video segments or video frames may be represented by an image feature extractor (e.g., a convolutional neural network (CNN) such as the CNN 206 or the DCN 350).

The video-level representation of the order-less approach may be learned by pooling the segment-level or frame-level features. The pooling mechanism may differ from one model to another. For example, different statistical pooling models include maximum and average pooling, attention pooling, rank pooling, dynamic images, and context gating, to name a few. A similar approach is a vector aggregation approach. A downside of statistical pooling and vector aggregation includes neglecting temporal order, which is an important visual cue. However, the upside is the ability to represent a minutes-long video or an hours-long video.

In order-centric approaches, a focal feature includes an order of temporal signals in videos. For example, long short term memories (LSTMs) may model a sequence of video frames, while three-dimensional (3D) CNNs extend two-dimensional (2D) CNNs to exploit the temporal dimension.

As noted, minutes-long and complex human or animal activity may be sub-divided into unit-actions. For example, the problem with the activity of making coffee is that there are different ways to prepare coffee. For instance, as shown in FIG. 4, the activity of making coffee may include the actions in which a human may take a cup→pour coffee→spoon sugar→stir coffee. The activity of making coffee could also include the actions: take cup→pour coffee→pour milk→pour sugar→stir coffee. However, there seems to be an over-arching weak temporal order of unit-actions when making coffee. As shown in FIG. 4, one usually starts with taking a cup and/or pouring coffee and ends up with pouring sugar.

It is desirable to learn a representation that maps all the different video instances of an activity (e.g., making a coffee) into a consistent feature representation. Such an activity can take minutes or even an hour to unfold. On one hand, order-centric methods can model only up to few-seconds of the video. On the other hand, order-less methods completely discard the structure of the video, which is an important visual cue.

Undirected graph-based representations lose arrow-of-time information. However, an up-side of undirected modeling is an ability to model pair-wise relationships between the unit-actions in the video. A graph may depict a storyline of an activity in the video. Each node in the graph may represent a unit-action and the links between nodes may represent a correlation between the unit-actions.

Unit-actions can be thought of as semantic concepts, shared across an entire video dataset. A challenge associated with the graph-based approach is a lack of annotation for unit-actions in an activity video. As a result, node information for the graph may be missing. To mitigate an absence of unit-actions, aspects of the present disclosure may substitute the unit-actions with latent concepts. In some aspects, the latent concepts may be learned by fully connected layers.

Another challenge is that link information for the graph may be missing. To mitigate the absence of link information, aspects of the present disclosure may measure a similarity between video segments and the latent concepts. This implementation may be achieved based on the modification of a self-attention module.

Figure 5:
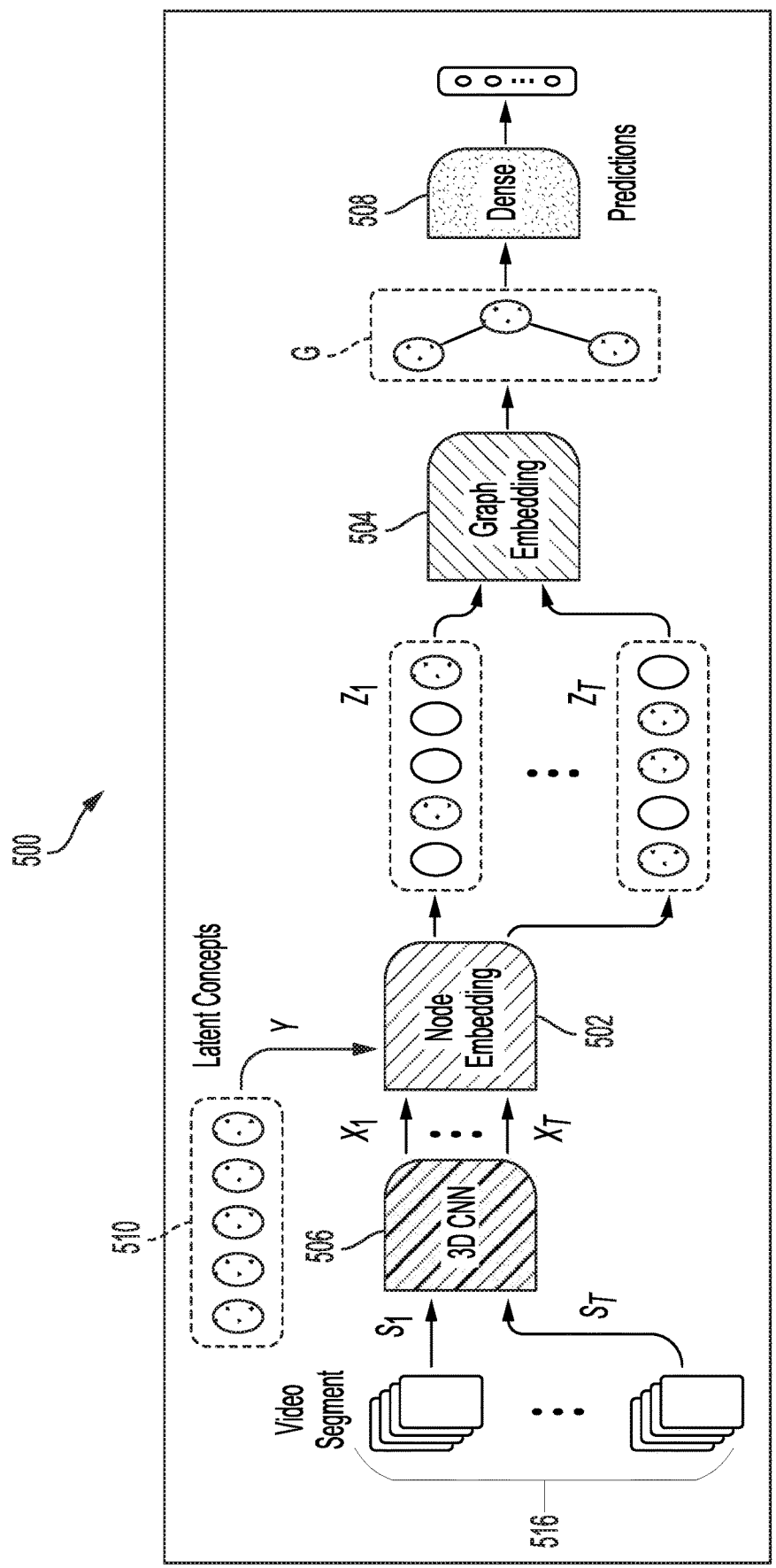
FIG. 5 illustrates a video-graph framework according to aspects of the present disclosure.

FIG. 5 illustrates a video-graph framework 500 according to aspects of the present disclosure. The video-graph framework 500 may learn graph nodes entirely from data rather than predefined nodes. The video-graph framework 500 also may learn graph edges including the relationship between graph nodes and how the graph nodes transition over time. The video-graph framework 500 includes an embedding block 502 (e.g., a node embedding block), a graph embedding layer 504, convolutional neural networks (CNN) 506, a first dense layer 508 (e.g., a multilayer perceptron (MIT)), and a latent concept module or device 510.

The video-graph framework 500 is designed to construct an undirected graph G=($\mathcal{N}$, ε) to represent a structure of human activity in a video v (516), where $\mathcal{N}$ represents the graph nodes and ε represents the graph edges. The graph nodes $\mathcal{N}$ may capture the key unit actions in the activity. The graph edges ε may capture the temporal relationship between these nodes (e.g., unit actions). In some aspects, the video-graph framework 500 can model the human activity in over thirty minutes of video. Thus, aspects of the present disclosure learn the interactions between unit actions that form longer activities, and thus may learn the general temporal structure of the activities.

Referring to FIG. 5, a video v is received at an input of the video-graph framework 500. The video v (516) may include T video segments and is represented as follows: v={$s_i$|i=1, 2, . . . , T}. The T video segments may be uniformly sampled or randomly sampled, for instance. Each segment si may be a burst of successive video frames (e.g., eight successive video frames). The video segments may be provided to the CNN 506. In some aspects, the CNN 506 may be a three-dimensional (3D) CNN where the three dimensions include a number of channels (C), height of the channel (H), and width of the channel (W). The CNN 506 processes the video segments and outputs feature representations of the video segments to the node embedding block 502. For example, the video segments may be represented as a feature $x_i \in \mathbb{R}^{1 \times H \times W \times C}$.

As noted, a challenge associated with graph-based approaches is that the graph nodes are missing and there are no annotations for unit-actions in an activity. In one aspect, the unit actions are represented by latent concepts. For example, the unit actions are represented by dominant latent concepts across an entire activity dataset. A set of N latent features Y may be learned as a way to represent the dominant latent concepts, where Y={$y_i$|j=1, 2, . . . , N}, $Y \in \mathbb{R}^{N \times C}$. The latent features Y is a vector representation of the graph nodes $\mathcal{N}$. The latent concepts represented by latent features may be learned by using randomly initialized concepts (e.g., using the latent concept module 510) followed by video classification using a dense layer of the embedding block 502 (e.g., a multilayer perceptron (MLP)) to learn the best embedding or feature based on initial values of the latent concepts.

Aspects of the present disclosure measure a similarity between the video segments and the latent concepts, such as the aforementioned latent concepts. This implementation may be achieved based on the modification of a self-attention module. Each video feature $x_i$ may be correlated with each of the latent or node features Y. For example, the node embedding block 502 receives as an input, the video feature $x_i$ (e.g., $x_1$-$x_T$) from the CNN 506 and all of the latent features Y from the latent concept module 510.

The node embedding block 502 outputs a vector representation of all of the video segments as a five-dimensional (5D) tensor Z={$Z_1, Z_2, \ldots, Z_T$}, $Z \in \mathbb{R}^{T \times N \times H \times W \times C}$, where N represents nodes; C represents a number of channels; H represents a height of the channels; and W represents a width of the channels. The 5D tensor is provided as an input to the graph embedding layer 504. The graph embedding layer 504 generates an output feature or graph G that is then supplied to the dense layer 508 (e.g., a hidden layer MLP) for classification. In turn, the dense layer 508 outputs predictions of the human activity.

Figure 6:
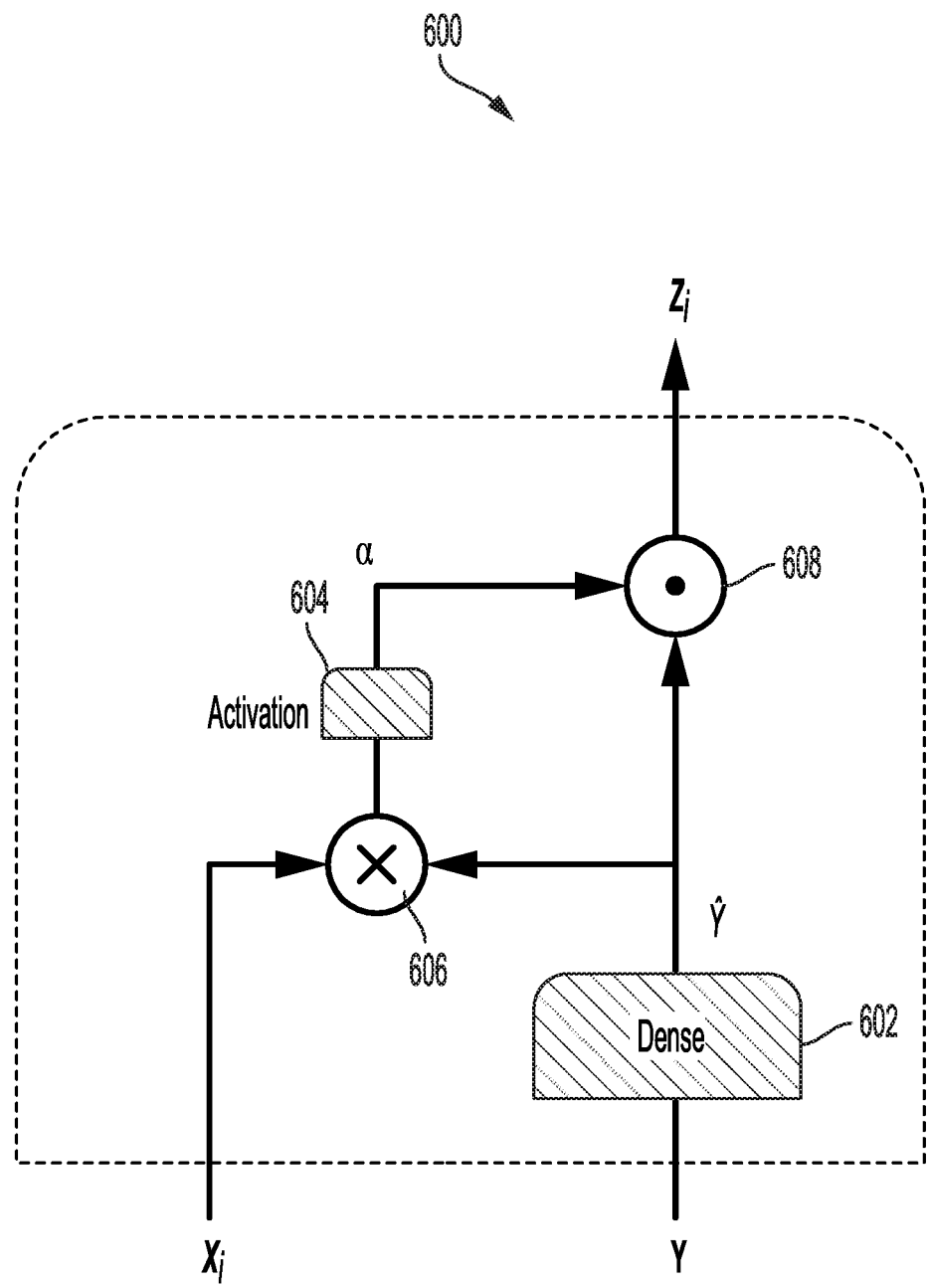
FIG. 6 illustrates an exemplary node embedding block of the video-graph framework, according to aspects of the present disclosure.

FIG. 6 illustrates an exemplary node embedding block 600 in accordance with aspects of the present disclosure. The node embedding block 600 includes a second dense layer 602, an activation function module 604, a dot product module 606, and a multiplying module 608. In some aspects, the impementation and function of the node embedding block 502 of FIG. 5 may be similar to that of the node embedding block 600. The node embedding block 600 learns the graph nodes entirely from video datasets, which makes the disclosed video-graph framework (e.g., 500) applicable to videos without node-level annotations. For example, the node embedding block 600 measures a similarity between video segments and the latent concepts, such as the aforementioned latent concepts.

Each video feature $x_i$ may be correlated with each of the latent features Y. For example, the node embedding block 600 may receive as an input, the video feature $x_i$ from a CNN (e.g., CNN 506) as well as the latent features Y (e.g., from the latent concept device 510). The video features may be convolutional features, for example. Improved latent concepts may be learned depending on a training data set. Similarity features may be conditioned on the convolutional features and the latent concepts. A new feature to be output by the node embedding block 600 may be conditioned on both the similarity values and the latent concepts.

For example, the node embedding block 600 transforms or embeds an initial representation of the nodes Y into $\hat{Y}$, using the second dense layer 602. In some aspects, the second dense layer 602 may comprise one hidden layer MLP with weight and bias respectively represented as: $w \in \mathbb{R}^{C \times C}$ and $b \in \mathbb{R}^{1 \times C}$. The embedding makes the nodes learnable and better suited for the video dataset. Then, the dot product module 606 applies a dot product to measure a similarity between the feature $x_i$ and the embedded representation of the nodes $\hat{Y}$. An activation function σ is applied, by the activation function module 604, on the similarities to introduce non-linearity. The activation function module 604 outputs activation values $\alpha \in \mathbb{R}^{H \times W \times N}$, where N represents nodes, H represents the height of the channels, and W represents the width of the channels.

The embedded representation of the nodes $\hat{Y}$ are then multiplied, via the multiplying module 608, with the activation values α, based on a relationship of each node $\hat{y}i$ of the embedded representation of the nodes $\hat{Y}$ to the feature $x_j$. In other words, each node $\hat{y}i$ is "attended to" based on how much each node is related to the feature $x_j$. The output of the multiplying module 608 is the "attended" nodes $Z_i=\{z_{ij}|j=1, 2, \ldots, N\}$, $Z_i \in R^{N \times H \times W \times C}$, where $Z_i$ is referred as "nodes embedding" and $z_{ij}$ is referred to as a node feature in $Z_i$. Accordingly, the node embedding block 600 may compute the attended as follows:

$$\hat{Y}=w*Y+b \quad (1)$$

$$\alpha=\sigma(x_i*\hat{Y}^T) \quad (2)$$

$$Z_i=\alpha \odot y_j, \quad (3)$$

The resultant vector representation of all of the video segments is the five-dimensional (5D) tensor $Z=\{Z_1, Z_2, \ldots, Z_T\}$, $Z \in R^{T \times N \times H \times W \times C}$.

Having learned the graph nodes $\hat{Y}$, which is a vector representation of the graph nodes $\mathcal{N}$, the graph edges ε may also be learned. As previously disclosed, the graph embedding layer 504 may learn a relationship between the graph nodes and the temporal transitions between the graph nodes.

Figure 7:
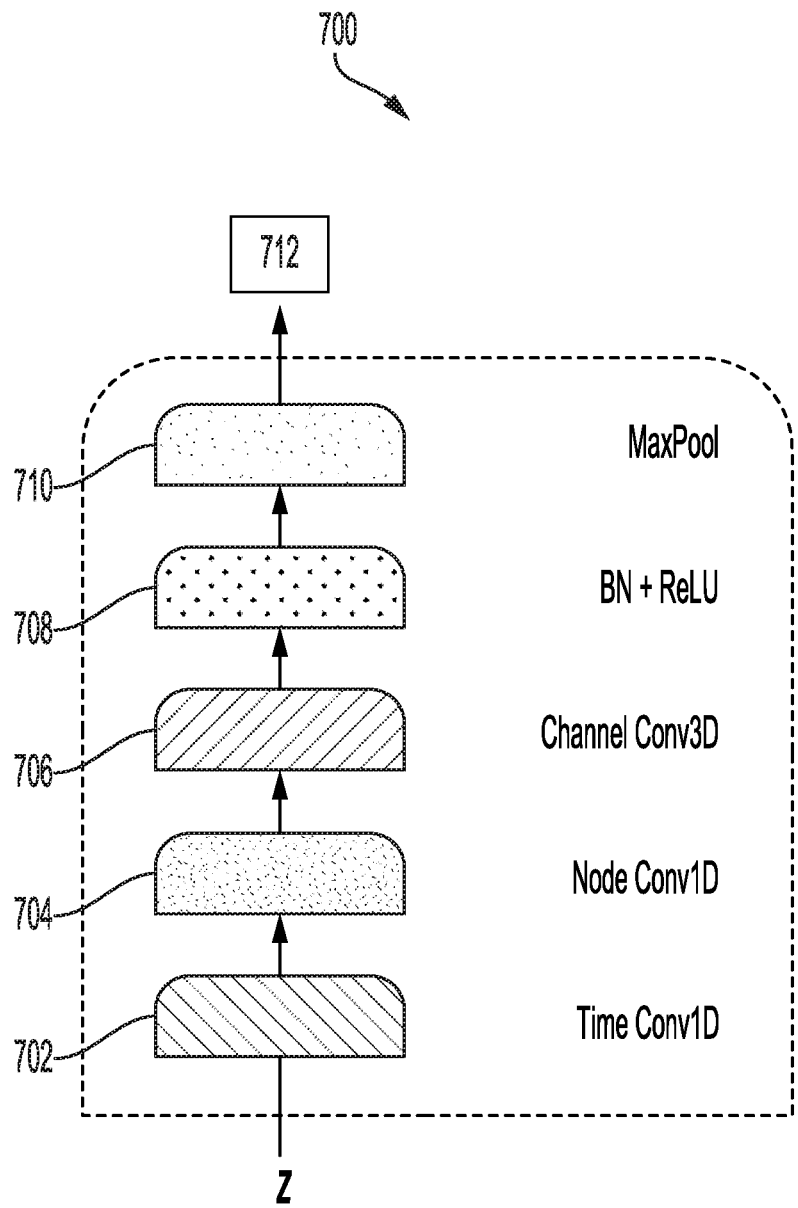
FIG. 7 illustrates an exemplary graph embedding layer of the video-graph framework according to aspects of the present disclosure.

FIG. 7 illustrates an exemplary graph embedding layer 700, according to aspects of the present disclosure. The graph embedding layer 700 learns a relationship between the graph nodes (e.g., graph edges) to generate an output representing temporal structures of the human activity. In some aspects, the impementation and function of the graph embedding block 504 of FIG. 5 may be similar to that of the graph embedding layer 700. The graph embedding layer 700 includes a time-wise neural network 702 (e.g., a one-dimensional convolutional neural network), a node-wise neural network 704 (e.g., another one-dimensional neural network), a channel-wise neural network 706 (e.g., a three-dimensional neural network), a batch normalization and rectified linear unit (ReLU) layer 708 and a max pooling layer 710.

As noted, the five-dimensional (5D) tensor $Z=\{Z_1, Z_2, \ldots, Z_T\}$, $Z \in R^{T \times N \times H \times W \times C}$ is provided as an input to the graph embedding layer 700. The graph embedding layer 700 models a set of T successive node-embeddings Z using three types of convolutions. The three types of convolution include a time-wise convolution performed by the time-wise neural network 702, a node-wise convolution performed by the node-wise neural network 704, and a channel-wise convolution performed by the channel-wise neural network 706. The time-wise convolution learns the temporal transition of node-embeddings. The node-wise convolution learns the relationships between the nodes and the channel-wise convolution learns the correlation between channels for each node represented and updates the representation for each node.

For example, the five-dimensional tensor is received by the time-wise neural network 702, which applies a time-wise one-dimensional convolution on temporal dimensions of the five-dimensional (5D) tensor Z. For example, consider successive video segments $s_i$, $s_{i+1}$, represented as $Z_i$, $Z_{i+1}$. To learn the temporal transition between them, a time-wise one-dimensional convolution is applied on their temporal dimension. The time-wise neural network 702 is efficient in learning temporal concepts. One kernel learned by the time-wise neural network 702 is the 5D tensor $k^T \in R^{t \times 1 \times 1 \times 1 \times 1}$, where t is the kernel size. In total, C kernels are learned in order to keep the channel dimension unchanged.

In addition to learning the temporal transition between two node-embeddings $Z_i$, $Z_{i+1}$, the relationship between the nodes $\{z_{ij}|j=1, 2, \ldots, N\}$ inside each node embedding $Z_i$ is also learned. In one aspect, a number of adjacent nodes (e.g., neighbors) that each node $z_{ij}$ can have is restricted. For example, each node $z_{ij}$ may be restricted to n adjacent nodes, which makes it possible to learn edge weights using node-wise convolution. The node-wise convolution may be applied to only the node dimension of a specific $Z_i$. One kernel learned by the node-wise convolution is the 5D tensor $k^N \in R^{1 \times n \times 1 \times 1 \times 1}$, where n is the kernel size. Accordingly, C kernels are learned in order to keep the channel dimension of the feature Z unchanged.

Because both the time-wise and node-wise convolutions learn graph edges separately for each channel in the features Z, the time-wise and node-wise convolutions are followed by a channel-wise convolution to model cross-channel correlations in each node feature $z_{ij}$. The channel-wise convolution learns C different kernels, with each kernel based on the 5D tensor $k^C \in R^{1 \times 1 \times 1 \times 1 \times C}$.

After learning the graph edges using the convolutional operations, batch normalization and rectification are performed by the batch normalization and rectified linear unit layer 708 to achieve non-linearity of the graph representation Z. The entire graph representation Z is then down-sampled over both time and node dimensions using a max pooling operation. The max pooling operation is performed by the max pooling layer 710. In one exemplary aspect, the max pooling layer 710 may use kernel size four (4) and stride four (4) for both the time and node dimensions. Thus, after one layer of graph embedding, the resulting graph representation G is reduced from T×N×H×W×C to (T/4)×(N/4)×H×W×C.

An output feature or graph representation G (712) from the graph embedding layer 700 may then provided for classification (e.g., via first dense layer 508).

Figure 8:
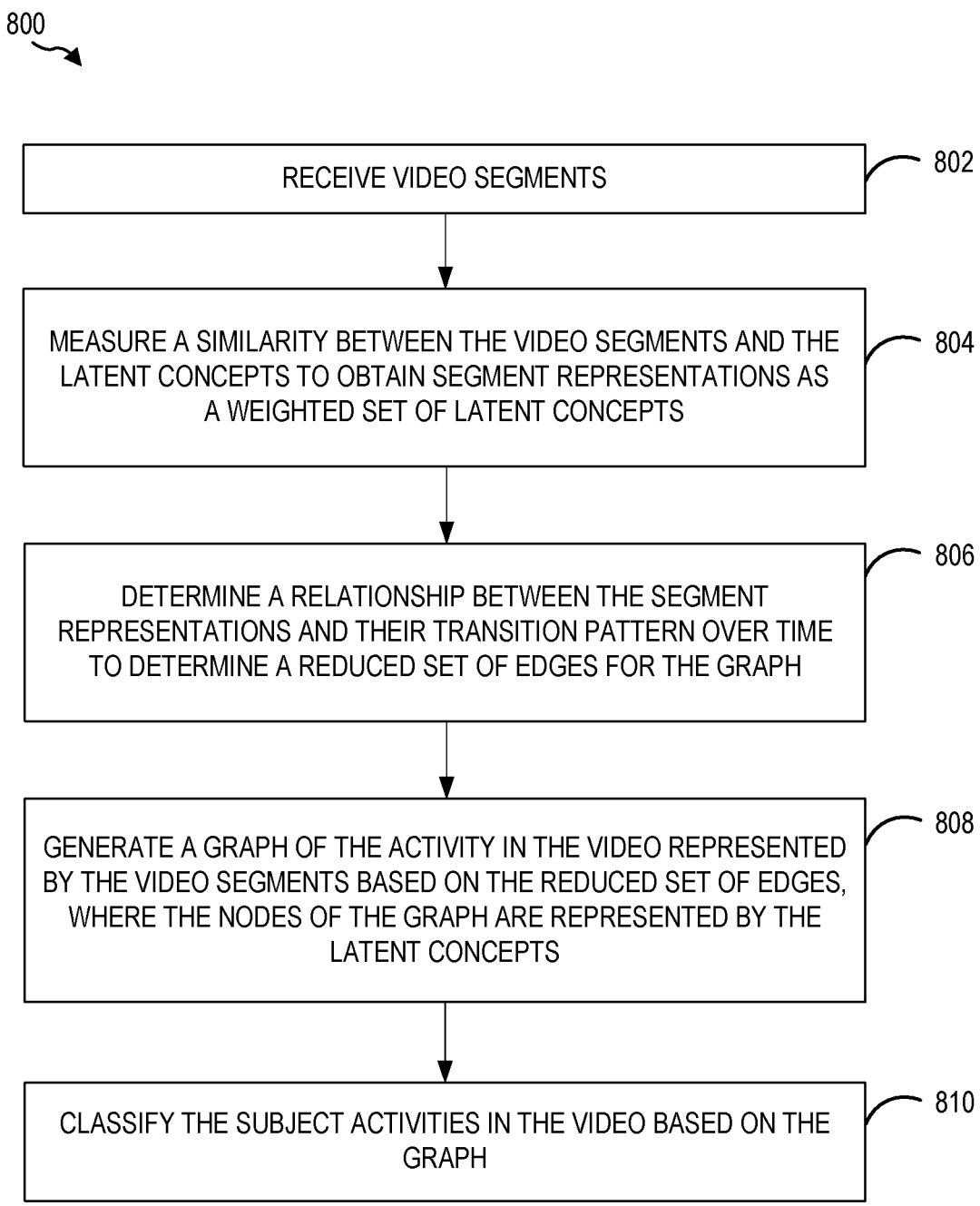
FIG. 8 illustrates a method for classifying subject activities in videos, in accordance with aspects of the present disclosure.

FIG. 8 illustrates a method for classifying minutes-long subject activities in videos, in accordance with aspects of the present disclosure. As shown in FIG. 8, at block 802, the video-graph framework receives video segments. For example, referring to FIG. 5, a video v is received at an input of the video-graph framework 500. The video v may include T video segments and is represented as follows: $v=\{s_i|i=1, 2, \ldots, T\}$. The T video segments may be uniformly sampled or randomly sampled, for instance. Each segment si may be a burst of successive video frames (e.g., eight successive video frames).

At block 804, a node embedding block of the video-graph framework measures a similarity between the video segments and the previously generated concepts (e.g., nodes of a potential graph to be generated for an activity in a video) to obtain segment representations as a weighted set of previously generated concepts. For instance, referring to FIG. 6, the node embedding block 600 learns the graph nodes entirely from video datasets, which makes the disclosed video-graph framework (e.g., 500) applicable to videos without node-level annotations. For example, the node embedding block 600 measures a similarity between video segments and the previously generated concepts, such as the aforementioned previously generated concepts.

At block 806, a graph embedding layer determines a relationship between the segment representations and their transitioning pattern over time to determine a reduced set of edges for the graph. At block 808, the graph embedding layer generates a graph of the activity in the video represented by the video segments based on the reduced set of edges. The nodes of the graph are represented by the previously generated concepts. In another example, referring to FIG. 7, the graph embedding layer 700 learns a relationship between the graph nodes (e.g., graph edges) to generate an output representing temporal structures of the human activity.

At block 810, a classifier classifies the activity in the video based on the generated graph. In one example, referring to FIG. 5, the dense layer 508 (e.g., a hidden layer MLP) receives an output feature or graph G for classification. In turn, the dense layer 508 outputs predictions of the human activity.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for classifying subject activities in videos, comprising:
   receiving video segments of a video;
   measuring a similarity between the video segments and previously generated concepts to obtain segment representations as a weighted set of previously generated concepts;
   determining a relationship between the segment representations and their transitioning pattern over time to determine a reduced set of nodes and/or edges for a graph;
   generating the graph of an activity in the video represented by the video segments based on the reduced set of nodes and/or edges, where nodes of the graph are represented by the previously generated concepts; and
   classifying subject activities in the video based on the graph.

2. The method of claim 1, further comprising learning the previously generated concepts that are analogous to the nodes of the graph to be generated for the activity in the video.

3. The method of claim 1, in which each of the video segments comprises eight successive frames.

4. The method of claim 1, further comprising learning the previously generated concepts using fully connected layers.

5. The method of claim 1, in which the previously generated concepts represent key actions of human activities in a video dataset.

6. The method of claim 1, in which receiving the video segments comprises providing the video segments to a three-dimensional (3D) convolutional neural network (CNN) where the 3D CNN outputs a convolutional feature.

7. The method of claim 6, in which measuring the similarity between the video segments and the previously generated concepts comprises:
   receiving the convolutional feature and the previously generated concepts;
   learning improved previously generated concepts depending on a training data set;
   learning similarity values conditioned on both the convolutional feature and the previously generated concepts; and
   learning a new feature conditioned on both the similarity values and the previously generated concepts that are improved.

8. The method of claim 1, further comprising modelling the graph using graph embedding layers to obtain a final video representation before a classifier.

9. An apparatus for classifying subject activities in videos, the apparatus comprising:
   a memory; and
   at least one processor coupled to the memory, the at least one processor configured:
      to receive video segments of a video;
      to measure a similarity between the video segments and previously generated concepts to obtain segment representations as a weighted set of previously generated concepts;
      to determine a relationship between the segment representations and their transitioning pattern over time to determine a reduced set of nodes and/or edges for a graph;
      to generate the graph of an activity in the video represented by the video segments based on the reduced set of nodes and/or edges, where nodes of the graph are represented by the previously generated concepts; and
      to classify subject activities in the video based on the graph.

10. The apparatus of claim 9, in which the at least one processor is further configured to learn the previously generated concepts that are analogous to the nodes of the graph to be generated of the activity in the video.

11. The apparatus of claim 9, in which each of the video segments comprises eight successive frames.

12. The apparatus of claim 9, in which the at least one processor is further configured to learn the previously generated concepts using fully connected layers.

13. The apparatus of claim 9, in which the previously generated concepts represent key actions of human activities in a video dataset.

14. The apparatus of claim 9, in which the at least one processor is further configured to provide the video segments to a three-dimensional (3D) convolutional neural network (CNN) where the 3D CNN outputs a convolutional feature.

15. The apparatus of claim 14, in which the at least one processor is further configured to measure the similarity between the video segments and the previously generated concepts by:
   receiving the convolutional feature and the previously generated concepts;
   learning improved previously generated concepts depending on a training data set;
   learning similarity values conditioned on both the convolutional feature and the previously generated concepts; and
   learning a new feature conditioned on both the similarity values and the previously generated concepts that are improved.

16. The apparatus of claim 9, in which the at least one processor is further configured to model the graph using graph embedding layers to obtain a final video representation before a classifier.

17. A non-transitory computer-readable medium having program code recorded thereon for classifying subject activities in videos, the program code executed by a processor and comprising:
   program code to receive video segments of a video;
   program code to measure a similarity between the video segments and previously generated concepts to obtain segment representations as a weighted set of previously generated concepts;
   program code to determine a relationship between the segment representations and their transitioning pattern over time to determine a reduced set of nodes and/or edges for a graph;
   program code to generate the graph of an activity in the video represented by the video segments based on the reduced set of nodes and/or edges, where nodes of the graph are represented by the previously generated concepts; and
   program code to classify subject activities in the video based on the graph.

18. The computer-readable medium of claim 17, further comprising program code to learn previously generated concepts that are analogous to the nodes of the graph to be generated of the activity in the video.

19. The computer-readable medium of claim 17, in which each of the video segments comprise eight successive frames.

20. An apparatus for classifying subject activities in videos, comprising:
   means for receiving video segments of a video;
   means for measuring a similarity between the video segments and previously generated concepts to obtain segment representations as a weighted set of previously generated concepts;
   means for determining a relationship between the segment representations and their transitioning pattern over time to determine a reduced set of nodes and/or edges for a graph;
   means for generating the graph of an activity in the video represented by the video segments based on the reduced set of nodes and/or edges, where nodes of the graph are represented by the previously generated concepts; and
   means for classifying subject activities in the video based on the graph.

* * * * *